United States Patent [19]

Moore

[11] Patent Number: 5,524,956

[45] Date of Patent: Jun. 11, 1996

[54] FOLDABLE BACKREST AND SEAT AND HAND WARMER

[76] Inventor: Perry B. Moore, Rte. 4, Box 423-A, Canton, N.C. 28716

[21] Appl. No.: 368,980

[22] Filed: Jan. 5, 1995

[51] Int. Cl.[6] .................... A47C 1/00; A47C 9/10
[52] U.S. Cl. .................... 297/4; 297/382
[58] Field of Search ............... 297/4, 230.12, 297/250.1, 256, 352, 382, 188.04

[56] References Cited

U.S. PATENT DOCUMENTS

| | | | |
|---|---|---|---|
| 1,404,451 | 1/1922 | Love | 297/382 X |
| 1,422,908 | 7/1922 | Wittcoff | 297/382 X |
| 1,882,468 | 10/1932 | Wittcoff | 297/382 X |
| 3,066,980 | 12/1962 | Clute | 297/352 X |
| 3,185,362 | 5/1965 | Wakefield | 297/4 X |
| 4,588,224 | 5/1986 | Hill, Jr. | 297/4 |
| 4,843,662 | 7/1989 | Handleman | 297/382 X |
| 4,923,247 | 5/1990 | Malmstrom | 297/4 |
| 4,955,665 | 9/1990 | Richer | 297/4 |

Primary Examiner—Peter M. Cuomo
Assistant Examiner—Rodney B. White

[57] ABSTRACT

A portable folding device for providing comfort for people engaged in outdoor activities is disclosed. The device comprises a padded cushion having a lower section, an upper section, and a middle section therebetween. Included is an elongated cord in removable communication with a plurality of eyelets disposed on an upper edge of the upper section. A plurality of ties in removable communication with the eyelets and a plurality of rings oriented on an outer face of the middle section. Further included is a belt in cooperative relationship for coupling the device to the waist of the outdoorsman. A hood is disposed on an outside surface of the upper section and has a downwardly disposed slit. A plurality of sleeves are oriented on an outer surface and an inner surface of the middle section of the cushion and the cushion has an outer skin adapted to resist water. The outer skin has camouflage markings for appearing like foliage. The cushion has a fiber material filing an interior chamber therein. The fiber material is water, mold, and mildew resistant.

11 Claims, 3 Drawing Sheets

FOLDABLE BACKREST AND SEAT AND HAND WARMER

BACKGROUND OF THE INVENTION

1. Field of the Invention

The present invention relates to a new and improved foldable backrest and seat and hand warmer and, more particularly, pertains to a cushion for increased comfort for people engaged in outdoor activities such as hunting, football spectatorship or the like.

2. Description of the Prior Art

The use of complex devices having many parts and being difficult to deploy and use outdoors is known in the prior art. More specifically, complex devices heretofore devised and utilized for the purpose of portable seats and backrest and hand warmers are known to consist basically of familiar, expected, and obvious structural configurations, notwithstanding the myriad of designs encompassed by the crowded prior art which has been developed for the fulfillment of countless objectives and requirements.

The prior art discloses a large number of complex devices having many parts and being difficult to deploy and use outdoors. By way of example, U.S. Pat. No. 5,253,732 issued to Daniels discloses a portable folding tree stand having upper and lower tubular sections hinged together in an aligned relationship for providing vertical staggered steps for ascending and descending a pole ladder oriented adjacent to a tree.

U.S. Pat. No. 5,156,236 issued to Gardner et al. discloses a climbing tree stand having two frames with each frame having a rigid base portion and a flexible adjustable encircling band for gripping a tree around the trunk.

U.S. Pat. No. 4,947,499 issued to Rilovich discloses a portable back rest for support of a person's back at a beach or other outdoor location and further having a collapsible structure that folds into a small portable unit for carrying or storage.

U.S. Pat. No. Des. 341,965 issued to Chapman appears to disclose a portable back rest for use by a person.

U.S. Pat. No. Des. 261,084 issued to Scott appears to disclose a portable back rest.

U.S. Pat. No. 5,209,381 issued to Jay discloses a convertible backpack assembly for carrying items therein and also providing a readily adaptable assembly for conversion to a chair for use on a beach or other outdoor location.

In this respect, the foldable backrest and seat and hand warmer according to the present invention substantially departs from the conventional concepts and designs of the prior art, and in doing so provides an apparatus primarily developed for the purpose of increased comfort for people engaged in outdoor activities such as hunting, football spectatorship or the like.

Therefore, it can be appreciated that there exists a continuing need for a new and improved foldable backrest and seat and hand warmer which can be used in particular for increased comfort for people engaged in outdoor activities such as hunting, football spectatorship or the like. In this regard, the present invention substantially fulfills this need.

It is therefore an object of the present invention to provide a new and improved foldable backrest and seat and hand warmer which has all the advantages of the prior art devices and none of the disadvantages.

It is an object of the invention to provide a backrest to give comfort to outdoorsmen while hunting or the like.

It is a further object of the invention to provide a backrest and a seat cushion for a person engaged in outdoor spectator sports such as football in a stadium.

It is a still further object of the invention to provide a camouflage appearance to the wearer of the invention to blend with the natural surroundings when hunting or fishing or the like.

It is yet another object of the invention to provide a water-resistant outer shell to resist water penetration which could reduce the effectiveness of the invention.

It is still yet another object of the invention to provide a fiber-filled cushioning material in the cushion to give comfort to the outdoorsman when deployed in a seat orientation such as resting against a tree.

It is yet another object of the invention to provide secure engagement with a wooden backrest typically found in outdoor spectator stadiums such as football stadiums or the like.

It is yet another object of the invention to provide a warming section to comfort the lumbar region of the outdoorsman when deployed in a hunting setting or a spectator setting.

It is yet still another object of the invention to provide means to store artificial heating pouches to allow the person to warm their hands when needed.

It is another object of the invention to provide a belt to attach the invention to the waist of the user when moving from place to place.

It is yet still another object of the invention to provide an elastic cord to allow the outdoorsman to secure the invention to a tree or other outdoor object prior to use and operation.

It is another object of the present invention to provide a new and improved foldable backrest and seat and hand warmer which may be easily and efficiently manufactured and marketed.

It is a further object of the present invention to provide a new and improved foldable backrest and seat and hand warmer which is of a durable and reliable construction.

An even further object of the present invention is to provide a new and improved foldable backrest and seat and hand warmer which is susceptible of a low cost of manufacture with regard to both materials and labor, and which accordingly is then susceptible of low prices of sale to the consuming public, thereby making such a foldable backrest and seat and hand warmer economically available to the buying public.

Still yet another object of the present invention is to provide a new and improved foldable backrest and seat and hand warmer which provides in the apparatuses and methods of the prior art the advantages thereof, while simultaneously overcoming the disadvantages normally associated therewith.

Lastly, it is an object of the present invention to provide a portable folding device for people engaged in outdoor activities comprising a padded cushion having a lower section, an upper section, and a middle section therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

SUMMARY OF THE INVENTION

In view of the foregoing disadvantages inherent in the known types of complex devices having many parts and being difficult to deploy and use outdoors now present in the prior art, the present invention provides a new and improved foldable backrest and seat and hand warmer. As such, the general purpose of the present invention, which will be described subsequently in greater detail, is to provide a new and improved foldable backrest and seat and hand warmer which have all the advantages of the prior art and none of the disadvantages.

To attain this, the present invention essentially comprises a portable folding backrest device for providing comfort for people engaged in outdoor activities. The invention has a padded cushion having a lower section adapted for the outdoorsman to sit on, an upper section adapted for supporting the thoracic region of the outdoorsman's back and a middle section therebetween, adapted for supporting the lumbar region of the outdoorsman's back. An elongated cord is in removable communication with a plurality of eyelets disposed on an upper edge of the upper section for securing the cushion to a tree when the outdoorsman wishes to rest. A plurality of ties are in removable communication with the eyelets and a plurality of rings oriented on an outer face of the middle section for maintaining secure foldable communication between the sections when not in use and operation. A belt is provided for coupling the device to the waist of the outdoorsman when moving from place to place.

A hood is disposed on an outside surface of the upper section and has a downwardly disposed slit adapted for removable engagement with an upper section of a typical seat at a spectator event in an outdoor stadium. A plurality of sleeves are oriented on an outer surface and an inner surface of the middle section of the cushion to receive and warm the outdoorsman's hands and back.

The cushion has an outer skin adapted to resist water and has camouflage surface markings for appearing like foliage. The cushion has a fiber material filling which is water, mold, and mildew resistant and fills an interior chamber therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent Number and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 discloses the back warmer pocket on a left surface of a middle section of the device and a hand warming pocket on a right surface of the middle section of the hand warming device.

The same reference numerals refer to the same parts throughout the various Figures.

DESCRIPTION OF THE PREFERRED EMBODIMENT

Figure 1:
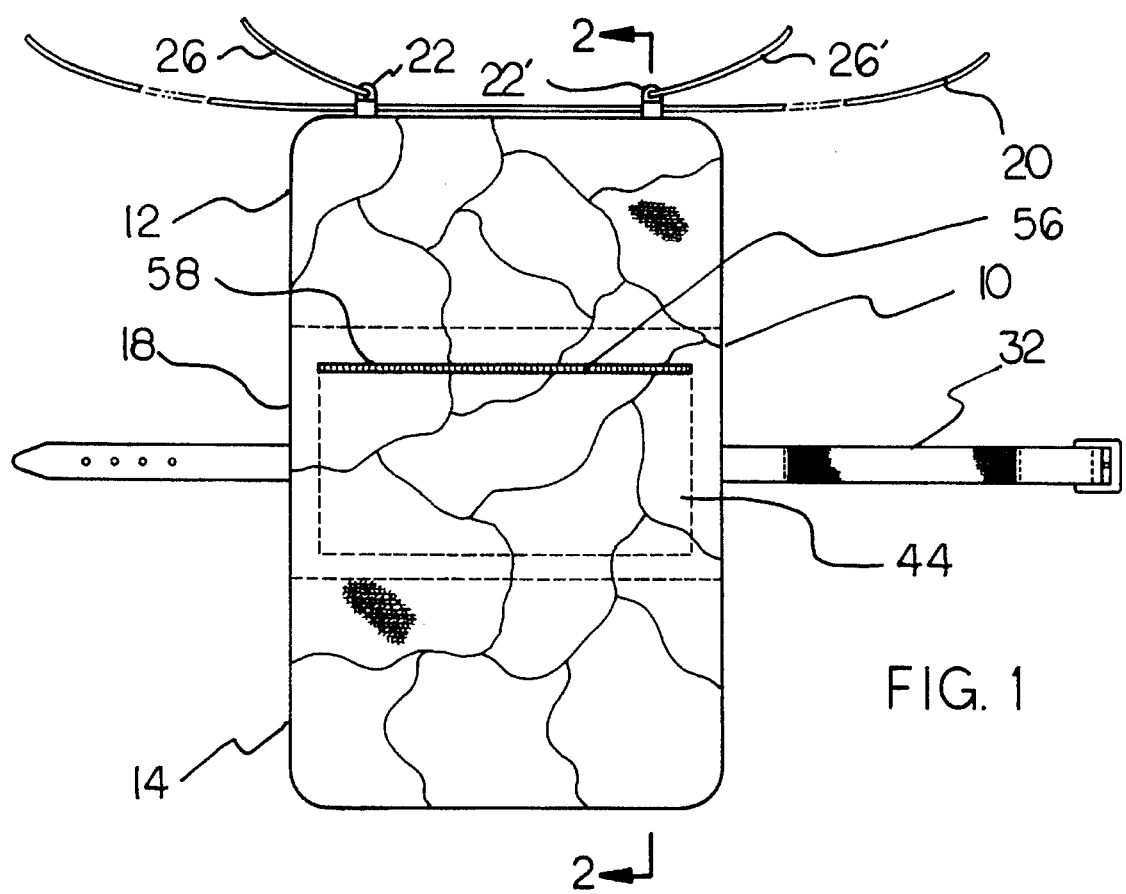
FIG. 1 is a perspective illustration of the preferred embodiment of the foldable backrest and seat and hand warmer constructed in accordance with the principles of the present invention.
Figure 2:
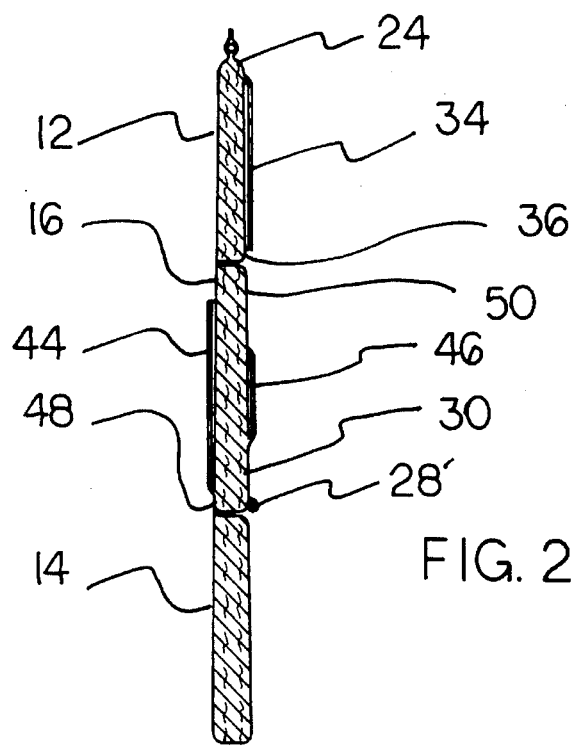
FIG. 2 is a cross-sectional elevational view of the device taken along viewing lines 2—2 in FIG. 1.
Figure 3:
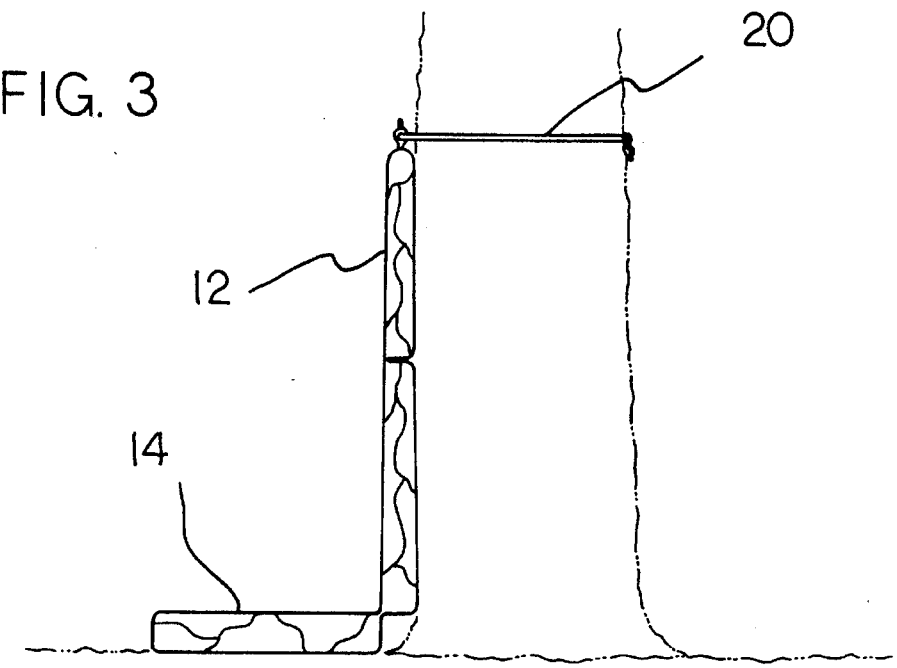
FIG. 3 is a right side elevation view of the invention disposed in an outdoor location and being secured to a tree with an elongated cord and further being oriented to provide a comfortable cushion for the outdoorsman to rest upon.
Figure 4:
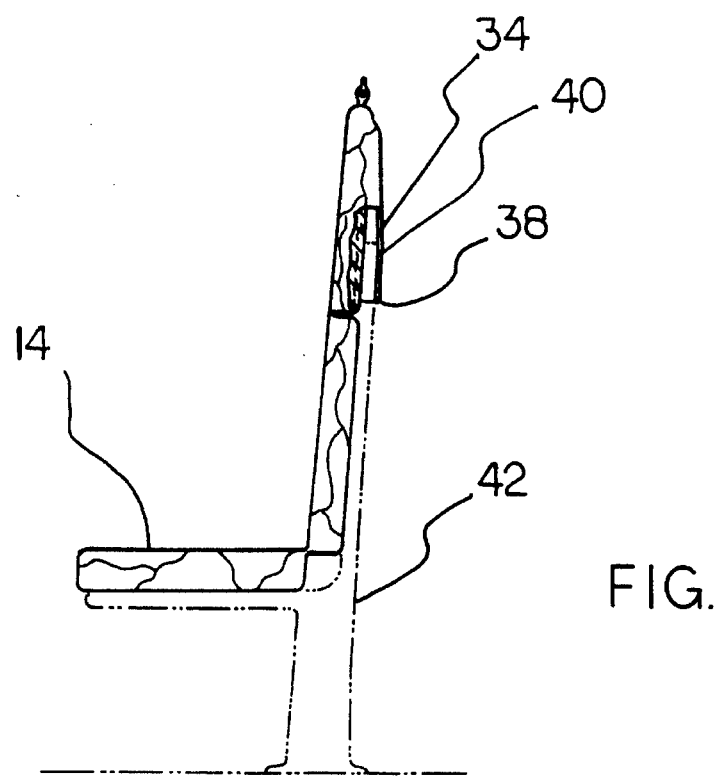
FIG. 4 is a right elevation view of the invention in a spectator sport stadium location disclosing the hood in an installed position over the back rest of a bench seat and the invention being oriented to provide a comfortable seat for the spectator.
Figure 5:
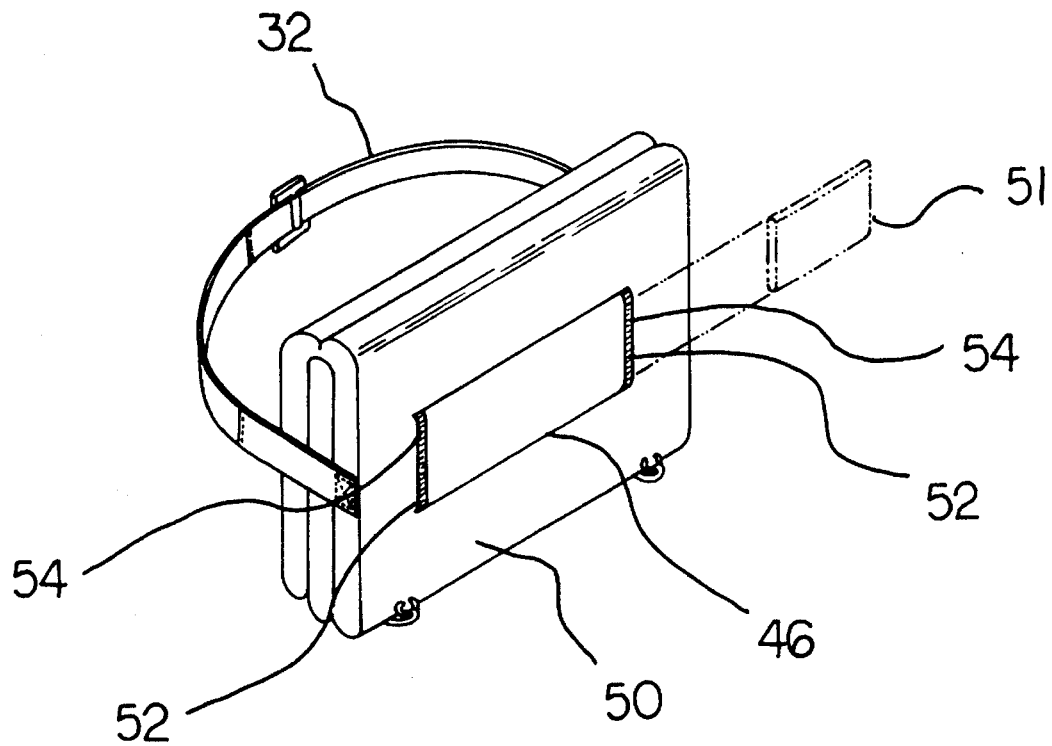
FIG. 5 is a perspective illustration of the invention disclosing the folded status and the belt being adapted to be worn around the outdoorsman's waist when moving from place to place. An artificial hand warmer is shown in phantom.
Figure 6:
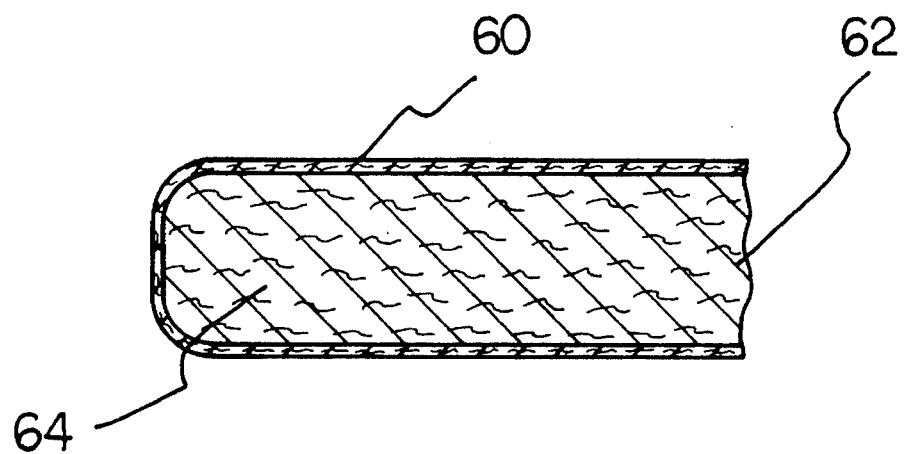
FIG. 6 is a typical cross-sectional view of the cushion showing the waterproof outer cover and the fiber-filled cushioning material therein.

With reference now to the drawings, and in particular to FIGS. 1 through 6 thereof, the preferred embodiment of the new and improved foldable backrest and seat and hand warmer embodying the principles and concepts of the present invention and generally designated by the reference numeral 10 will be described.

The present invention, the new and improved foldable backrest and seat and hand warmer, is a system comprised of a plurality of components. The components in their broadest context include a padded cushion, an elongated cord, a plurality of ties, a belt, and a hood. Each of the individual components is specifically configured and correlated one with respect to the other to attain the desired objectives.

The invention will be very helpful to outdoorsmen in settings such as hunting deer and also excellent for fans who spend extended periods of time in stadiums watching spectator sports such as football or the like. The invention will increase the comfort and warmth for an outdoorsman which will allow the outdoorsman to stay in an exposed position longer without undue adverse health consequences.

Referring generally to FIG. 1, the invention 10 comprises a padded cushion 12 having a lower section 14 adapted for the outdoorsman to sit on, an upper section 16 adapted for supporting the thoracic region of the outdoorsman's back, and a middle section 18 therebetween, adapted for supporting the lumbar region of the outdoorsman's back.

The invention attaches to a tree either for sitting on the ground or for tree stands that face away from the tree. In the case of an outdoor sporting event, the invention attaches to the upright portion of a conventional wooden backrest usually found in outdoor stadiums. When being moved from place to place, as in hunting, the invention is collapsed into a folded package and secured around the waist like a "fanny pack" until the hunter reaches the next hunting stand. Then, the invention is unfolded, and tied around any available tree.

An elongated cord 20 is in removable communication with a plurality of eyelets 22,22' disposed on an upper edge 24 of the upper section 16. The elongated cord 20 secures the cushion 12 to a tree when the outdoorsman wishes to rest. A plurality of ties 26,26' are in removable communication with the eyelets 22,22' and a plurality of rings 28,28' which are oriented on an outer face 30 of the middle section 18. The ties 26,26' maintain secure foldable communication between the sections 12,14,16 when not in use and operation. The short nylon ties 22,22' are used to secure the sections 12,14,16 after they have been folded to a collapsed folded status. The cord 20 is preferably made from a nylon string.

A belt 32 couples the cushion 12 to the waist of the outdoorsman when moving from place to place. The belt 32 has adjustments that allow the invention to be secured to the waist of the outdoorsman. The belt 32 is also made from any suitable camouflage material. A hood 34 is disposed on an outside surface 36 of the upper section 16 and has a downwardly disposed slit 38 adapted for removable engagement with an upper section 40 of a seat 42 in an outdoor stadium at a spectator event. The hood 34 is attached to the upper section 16 to accommodate the person outdoors while attending a spectator sport and who wishes to have a comfortable seat as opposed to the traditional hard wood seat and back rest usually found at most stadiums.

A plurality of sleeves 44,46 are oriented on an outer surface 48 and an inner surface 50, respectively, of the middle section 18 of the cushion 12. The sleeve 46 on the outer surface 50 of the cushion 12 is adapted to receive the outdoorsman's hands and an artificial warming means 51 to warm the outdoorsman's hands when desired. The inner sleeve 44 is adapted to receive the artificial warming means 51 to warm the lumbar region of the outdoorsman's back when in use and operation.

The sleeve 44 has a horizontally disposed slit at an upper edge 56 with a second elastic member 58 sewn thereon to hold the artificial warming means 51 securely in place when warming the lumbar region of the outdoorsman's back. The sleeve 46 is open at both ends and forms a tube. Any suitable artificial hand warmer can be inserted in the central portion of the sleeve 46. Each end 52,52' of the sleeve 46 has an elastic member 54,54' respectively, sewn on to securely engage the wrist of the outdoorsman when using the hand warmer feature of the invention.

An outer skin 60 on the cushion 12 is adapted to resist water and has camouflage surface markings for appearing like foliage when deployed outdoors. The cushion 12 has an interior chamber 62 therein which is filled with a fiber material 64. The fiber material 64 is fabricated from any suitable material, preferably a nylon material that is water, mold, and mildew resistant.

The outer skin 60 can made from any suitable camouflage material, preferably waterproofed nylon. The fiber filling 64 in the interior chamber 62 can be any suitable filler material, preferably, styrofoam "ball" filling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable folding backrest for providing comfort for people engaged in outdoor activities comprising, in combination:

a padded cushion capable of collapsing into a foldable package, the cushion having a lower section adapted for an outdoorsman to sit on, an upper section adapted for supporting a thoracic region of an outsdoorsman's back and a middle section therebetween adapted for supporting a lumbar region of an outsdoorsman's back, the upper section being correlated to the middle section and capable of being in foldable relationship therewith, the lower section being correlated to the middle section and capable of being in foldable relationship therewith;

an elongated cord in removable communication with a plurality of eyelets disposed on an upper edge of the upper section, the elongated cord for securing the cushion to a tree when the cushion is unfolded and the outdoorsman wishes to rest;

a plurality of ties in removable communication with the eyelets and a plurality of rings oriented on an outer face of the middle section, the ties and rings for maintaining a secure folded condition between the sections when not in use and operation for storing or carrying of the cushion by the outsdoorsman;

a belt for coupling the backrest to the waist of the outdoorsman when the sections are in a folded condition for allowing movement of the outsdoorsman from place to place;

a hood disposed on an outside surface of the upper section having a downwardly disposed slit adapted for removable engagement with an upper section of a typical stadium seat at a spectator event, the hood allowing the upper section and middle section to operate as a lumbar support while the lower section operates as a seat;

a plurality of sleeves oriented on an outer surface and an inner surface of the middle section of the cushion, the sleeve on the outer surface of the cushion being adapted to receive an outdoorsman's hands and an artificial warming means for warming purposes, the inner sleeve being adapted to receive the artificial warming means for warming a lumbar region of an outdoorsman's back when in use and operation;

an outer skin on the cushion adapted to resist water and having camouflage surface markings for appearing like foliage; and a fiber material filling an interior chamber therein each section of the cushion, the fiber material being water, mold, and mildew resistant.

2. A portable folding backrest for providing comfort for people engaged in outdoor activities comprising a padded cushion having a lower section, an upper section, a middle section and each section being correlated and in foldable relationship, an elongated cord in removable communication with a plurality of eyelets disposed on an upper edge of the upper section, the elongated cord for securing the cushion to a tree when the cushion is unfolded, a plurality of ties in removable communication with the eyelets and a plurality of rings oriented on an outer face of the middle section, a belt for coupling the backrest to the waist of the outdoorsman when the sections are in a folded condition, a hood disposed on an outside surface of the upper section having a downwardly disposed slit, a plurality of sleeves oriented on an outer surface and an inner surface of the middle section of the cushion, and each section of the cushion having an outer skin on the cushion adapted to resist water and having camouflage surface markings for appearing like foliage, and a fiber material filling an interior chamber therein of each section of the cushion, the fiber material being water, mold, and mildew resistant.

3. A portable folding backrest as recited in claim 2 wherein the lower section is adapted for the outdoorsman to sit on.

4. A portable folding backrest as recited in claim 2 wherein the upper section is adapted for supporting the thoracic region of the outdoorsman's back.

5. A portable folding backrest as recited in claim 2 wherein the middle section is adapted for supporting the lumbar region of the outdoorsman's back.

6. A portable folding backrest as recited in claim 2 wherein the elongated cord secures the cushion to a tree when the outdoorsman wishes to rest.

7. A portable folding backrest as recited in claim 2 wherein the ties and the rings are in a cooperative relationship for maintaining secure foldable communication between the sections when not in use and operation.

8. A portable folding backrest as recited in claim 2 wherein the belt is coupled to the waist of the user when moving from place to place.

9. A portable folding backrest as recited in claim 2 wherein the hood is adapted for removable engagement with an upper section of a typical stadium seat at a spectator event.

10. A portable folding backrest as recited in claim 2 wherein the sleeve on the outer surface of the cushion is adapted to receive the outdoorsman's hands and artificial warming means for warming purposes.

11. A portable folding backrest as recited in claim 2 wherein the inner sleeve is adapted to receive a second artificial warming means for warming the lumbar region of the outdoorsman's back when in use and operation.

* * * * *